(12) United States Patent
Nguyen-Schaefer et al.

(10) Patent No.: US 8,124,286 B2
(45) Date of Patent: Feb. 28, 2012

(54) FUEL CELL SYSTEM WITH A METERING UNIT

(75) Inventors: Thanh-Hung Nguyen-Schaefer, Asperg (DE); Frank Brenner, Remseck (DE); Guenther Bantleon, Leonberg (DE); Jens-Uwe Sparschuh, Nackenheim (DE); Thomas Hebner, Ditzingen (DE)

(73) Assignees: Robert Bosch GmbH, Stuttgart (DE); GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/094,297

(22) PCT Filed: Nov. 17, 2006

(86) PCT No.: PCT/EP2006/068609
§ 371 (c)(1),
(2), (4) Date: Sep. 26, 2008

(87) PCT Pub. No.: WO2007/060139
PCT Pub. Date: May 31, 2007

(65) Prior Publication Data
US 2009/0117444 A1 May 7, 2009

(30) Foreign Application Priority Data
Nov. 23, 2005 (DE) .......................... 10 2005 055 741

(51) Int. Cl.
*H01M 8/04* (2006.01)

(52) U.S. Cl. ........................................ 429/414; 429/413
(58) Field of Classification Search .................... 429/13, 429/23, 25, 414, 413, 416, 424, 431, 434
See application file for complete search history.

(56) References Cited

U.S. PATENT DOCUMENTS

| | | | |
|---|---|---|---|
| 3,597,275 A * | 8/1971 | Winsel et al. ................... | 429/14 |
| 6,103,410 A | 8/2000 | Fuller et al. | |
| 6,358,638 B1 | 3/2002 | Rock et al. | |
| 2003/0022034 A1* | 1/2003 | Suzuki ............................ | 429/13 |
| 2004/0028113 A1* | 2/2004 | Schlagheck et al. ........... | 374/57 |
| 2004/0197610 A1 | 10/2004 | Drunert | |
| 2004/0241511 A1* | 12/2004 | Kamihara et al. .............. | 429/22 |

FOREIGN PATENT DOCUMENTS
WO 2005/036682 4/2005
* cited by examiner

*Primary Examiner* — Cynthia H. Kelly
*Assistant Examiner* — Monique Wills
(74) *Attorney, Agent, or Firm* — Michael J. Striker

(57) ABSTRACT

The invention relates to a fuel cell installation comprising a fuel cell unit (6). Said installation is also provided with a dosing unit (8) which comprises at least one dosing valve (7) and is used to dose a fuel (10) for at least one anode (12) of the fuel cell unit (6), and a starting valve for dosing the fuel (10) for at least one cathode (19) of the fuel cell unit (6) during a starting phase. The aim of the invention is to be able to produce and operate one such fuel cell installation in an economical manner. To this end, at least one throttle element (18) comprising a fixed internal cross-sectional area is used to fix the maximum quantity of fuel that can be dosed in the starting phase.

10 Claims, 2 Drawing Sheets

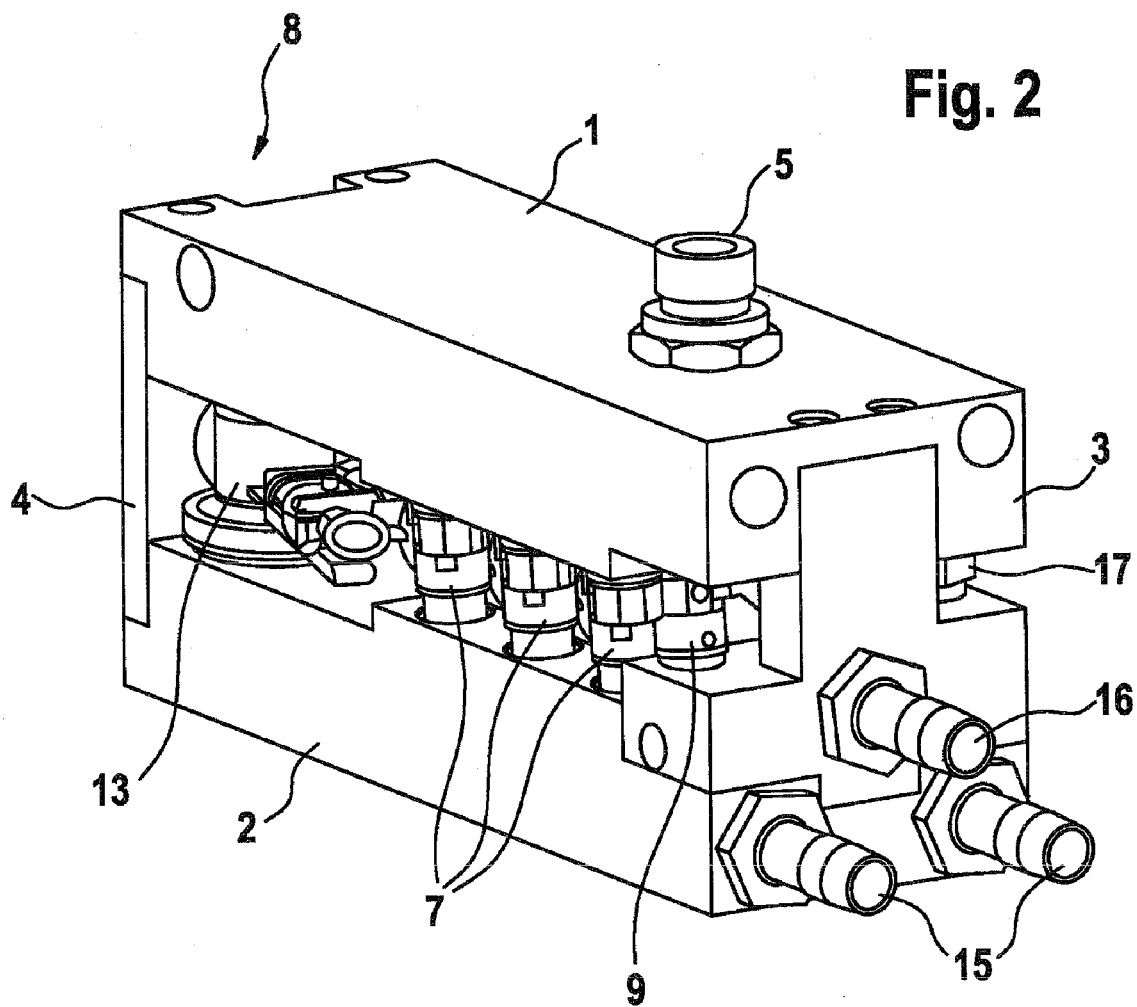

FUEL CELL SYSTEM WITH A METERING UNIT

CROSS-REFERENCE TO RELATED APPLICATION

The invention described and claimed hereinbelow is also described in German Patent Application DE 10 2005 055 741.4 filed on Nov. 23, 2005. This German Patent Application, whose subject matter is incorporated here by reference, provides the basis for a claim of priority of invention under 35 U.S.C. 119(a)-(d).

BACKGROUND OF THE INVENTION

The present invention relates to a fuel cell system with a fuel cell unit that includes a metering unit with at least one metering valve for metering the fuel, hydrogen in particular.

Modern fuel cell systems for stationary and mobile applications are generally operated such that the anode side is supplied with fuel, hydrogen in particular, and the cathode side is supplied with oxygen, air in particular. The incoming and outgoing gas flows are pumped or blown and released through the fuel cell stack.

At times, a relatively high portion of unconverted hydrogen is blown off of the anode side of the stack in particular. At times, the hydrogen-rich anode exhaust gas is pumped or recirculated in the circuit, to improve the overall efficiency of the system.

In addition, the cathode gases, at the least, are typically humidified before they enter the fuel cell stack, to prevent the proton-conducting membrane of the stack from drying out. Membranes or the MEA (membrane electrode assembly) of this type must have a certain minimum moisture level in order to conduct the protons.

To supply fuel to the fuel cell system, the flow of fuel or hydrogen and atmospheric oxygen must be supplied to the fuel cell stacks on an as-needed basis. Systems of this type may have various designs. For example, metering systems with one or more metering valves are provided, to ensure the largest metering range possible combined with a relatively low tolerance in terms of the quantity to be metered.

In addition, gas-supply systems are already known, in the case of which the fuel cell stack is supplied with the required quantity of fuel or hydrogen, and, in a start phase, both the anode and the cathode of the stack are supplied with hydrogen or fuel. The latter is realized in order to warm the cold fuel cell stack to the necessary and/or optimal operating temperature as quickly as possible. When heat is added, the atmospheric oxygen present in the fuel cell stack reacts with the fuel or hydrogen, thereby releasing heat energy.

The cathode of the fuel cell stack requires extremely small quantities of hydrogen in the start phase. The start valve must therefore be designed small in size, which means that specially developed start valves must be used. This results in relatively high costs, however.

SUMMARY OF THE INVENTION

The object of the present invention is to provide a fuel cell system with a fuel cell unit, in the case of which a metering unit with at least one metering valve is provided for metering a fuel for at least one anode of the fuel cell unit, and a start valve is provided for metering the fuel for at least one cathode of the fuel cell unit in a start phase, it being possible to manufacture and operate the fuel cell system more cost-effectively.

An inventive fuel cell system is therefore characterized by the fact that at least one fixed throttle element with an inner cross-sectional surface area is provided for establishing the maximum quantity of fuel that may be metered in the start phase, for the cathode in particular. With an inventive throttle element that includes these advantages, it become possible to limit the relatively small quantity of fuel required in the start phase, for the cathode in particular. This makes it possible to eliminate complex and expensive developments of special start valves. The costs to manufacture inventive fuel cell systems are reduced accordingly.

It also becomes possible, according to the present invention, to include start valves of the same type or with identical designs, e.g., in fuel cell systems with highly diverse outputs. The maximum quantity of fuel to be metered in the start phase for fuel cell units having different outputs is advantageously specified by the throttle element with the fixed inner cross-sectional area. Throttle elements with different inner cross-sectional areas or bores or the like are easy to manufacture. As a result, according to the present invention, the cost to develop and manufacture fuel cell systems with highly diverse outputs is also reduced.

For example, the throttle element is located upstream of the start valve, in the direction of fuel flow. The throttle element is preferably located downstream of the start valve, in the direction of fuel flow. It has been shown that this makes it possible to realize a particularly advantageous metering of the fuel quantity in the start phase.

In an advantageous variant of the present invention, the start valve is designed essentially identical to the metering valve. Due to this measure it is possible to use, e.g., identical metering valves and start valves in a fuel cell system according to the present invention, which results in a reduction of the cost to store parts and assemble the inventive fuel cell systems.

In addition, an essentially identical control or control units may be utilized to control the valves and meter the fuel quantity used. This results in a further simplification and cost reduction compared with the related art.

In a particular refinement of the present invention, the metering unit includes several metering valves, which are connected in parallel in particular and/or are essentially identical in design. This makes it possible to realize a relatively large quantity of fuel to be metered with a relatively small tolerance across the entire metering range. By using identical valves and stockpiling them, assembly and control are also simplified, which is economically advantageous.

Common commercial valves are preferably used as the start valve and/or metering valves, which further reduces costs.

Advantageously, at least one rinsing unit for rinsing the fuel cell unit with a rinsing fluid—air, in particular—is provided. By using a rinsing unit of this type, it is possible, e.g., to prevent deposits of critical quantities of hydrogen or the like in the system. For instance, the system is rinsed with air or the like after it is shut off.

In an advantageous variant of the present invention, the metering unit includes at least one reversing device for reversing the direction of fuel flow, at least in the anode of the fuel cell unit. This measure serves to advantageously compensate for or eliminate local inhomogeneities in terms of the moisture level/dryness of the membrane of the fuel cell unit. The efficiency of the fuel cell unit is improved as a result, and the strain on the fuel cell unit and/or the membrane are/is decisively reduced, thereby extending the expected service life.

It is possible that a periodic filling and emptying of the fuel cell unit—similar to the breathing cycle of a living being— may be realized. In a particular refinement of the present invention, the reversal of the fuel flow direction in the anode of the fuel cell unit is realized such that the flow passes through the anode on one side and then through the other side. This means that the input and output of the fuel cell unit and/or anode change constantly.

An assembly preferably includes, at the least, the metering unit and/or the start valve and/or the rinsing unit and/or a pressure-measuring device for measuring the fuel pressure. Using one of these measures, it is possible to realize a particularly compact unit, which essentially includes the gas supply or the supply of the fuel cell unit with fuel and/or oxygen or air. Compact gas-supply units of this type are particularly advantageous in motor vehicle applications, e.g., in passenger vehicles.

An exemplary embodiment of the present invention is shown in the drawing and is described in greater detail below with reference to the figures.

BRIEF DESCRIPTION OF THE DRAWINGS

FIG. 2 shows a schematic, perspective view of a gas supply unit according to the present invention.

DESCRIPTION OF THE PREFERRED EMBODIMENTS

Figure 1:
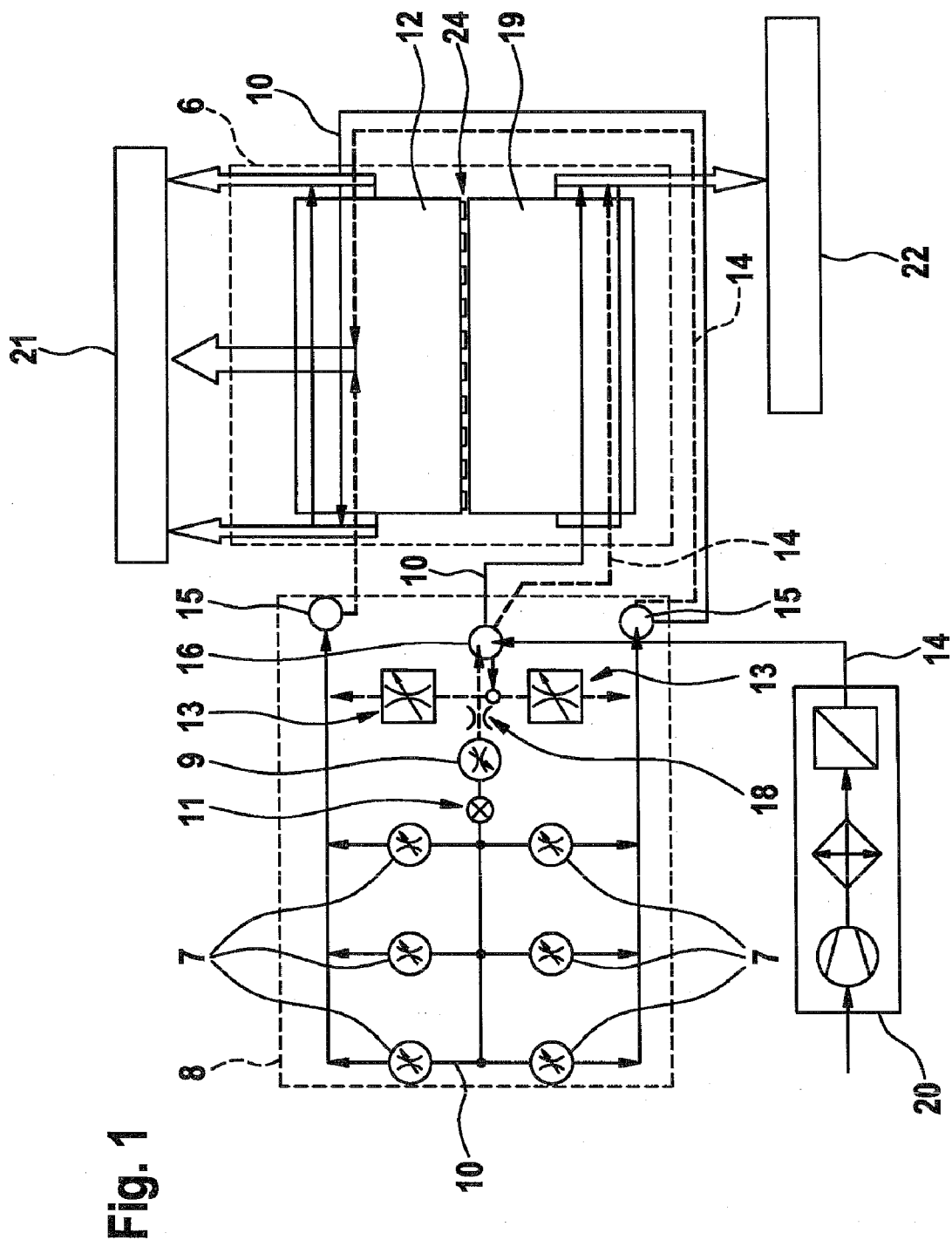
FIG. 1 shows a schematic diagram of a fuel cell system according to the present invention.

The block diagram of a fuel cell system according to the present invention, as shown in FIG. 1, includes a fuel cell unit 6, which is supplied with a fuel or hydrogen 10 for an anode 12, and with air 14 for a cathode 19 via a gas supply unit 8 or, in the exemplary embodiment shown, an "AIU" (anode inlet unit) 8.

An air supply unit 20 or a "CIU" (cathode inlet unit) 20 is installed upstream of AIU 8. It includes a pressure generator and/or a filter and/or a moisturizer, etc., as is common.

The system also includes an anode outlet unit (AOU) 21, with which its anode exhaust gasses are carried away. A cathode outlet unit (COU) 22 is also provided, with which the cathode exhaust gasses are carried away.

AIU 8 includes several metering valves 7. According to the variant shown, three valves connected in parallel are provided in each row. This makes it possible to realize a large metering-quantity range with a relatively high metering accuracy.

The two parallel-connected rows, each with three parallel-connected metering valves 7, are provided in particular so that hydrogen 10 may flow through fuel cell unit 10 and/or anode 12 in two opposite directions. To this end, the two rows are operated, i.e., opened/closed, in an alternating manner in order to meter the quantities of hydrogen.

In addition, a rinsing valve 13 is provided for each row, thereby making it advantageously possible to also rinse anode 12 with air 14 in the opposite direction. This step is preferably carried out after fuel cell unit 6 is shut off.

In the variant shown, cathode 19 is rinsed with air 14 in only one direction.

In addition, hydrogen 10 flows through cathode 19 in only one direction, in a start phase. The hydrogen for cathode 19 is metered using a start valve 9 and a throttle 18, which are connected in series.

Throttle 18 advantageously includes a fixed/unchangeable inner cross section, which limits the maximum quantity to be metered. According to the present invention, start valve 9 may have the same design as metering valves 7. This greatly simplifies stockpiling and the control of the available valves. It is also advantageous to utilize commercially available valves.

A pressure sensor 11 is also provided in AIU 8, which may be used to monitor a fuel pressure, which should be held as constant as possible. The metering of fuel or hydrogen 10 is improved further as a result, mainly in the start phase for the cathode 19.

FIG. 2 is a schematic, perspective depiction of a gas supply 8 or an AIU 8, as a compact assembly. Gas supply unit 8 is composed of an upper part 1 and a lower part 2, and two side parts 3, 4. Upper part 1 includes a connection 5 for the supply of fuel or hydrogen from a not-shown high-pressure tank. The inlet pressure may be, e.g., between 3 and 9 bar. Hydrogen 10 is directed into a not-shown storage chamber of AIU 8, from where it is distributed to metering valves 7.

In addition, the supply of start valve 9 and a not-shown cut-off passage to the connection of a pressure sensor 11 is realized using a not-shown supply line from the storage compartment.

Metering valves 7 are located such that, in the example shown, two rows with three valves each result (see FIG. 1).

In the variant shown, fuel cell unit 6 or fuel cell stack 6 is supplied with hydrogen 10 such that hydrogen 10 flows through the fuel cell stack from the inlet and from the outlet in an alternating manner, from each row of valves 7. A membrane 24 of fuel cell unit 6, which separates hydrogen 10 and atmospheric oxygen 14—the operating materials—is moistened largely evenly using this method.

In addition, upper part 1 includes a not-shown supply line that supplies the two rinsing valves 13 with rinse air 14. Lower part 2 includes two not-shown channels with receptacles for the rinsing and metering valves, and outlets 15, which lead to the inlet and outlet of fuel cell stack 6.

A side part 3 is designed as a connecting part. Via an air supply line 16, rinse air 14 is directed via a connecting piece 17 into upper part 1, to supply rinsing valves 13, and a connection from start valve 9 via installed throttle 18 is ensured for the start procedure. Second side part 4 serves as a connecting element and receptacle for a not-shown connection plug with the necessary cable connections.

What is claimed is:

1. A fuel cell system with a fuel cell unit (6), including a metering unit (8) with at least one metering valve (7) for metering a fuel (10) for at least one anode (12) of the fuel cell unit (6), and including a start valve (9) configured to meter the same fuel (10) for at least one cathode (19) of the fuel cell unit (6) in the start phase, wherein at least one fixed throttle element (18) with an inner cross-sectional surface area is provided upstream of the fuel cell unit (6) for establishing the maximum quantity of fuel that may be metered in the start phase.

2. The fuel cell system as recited in claim 1,
wherein the throttle element (18) is located downstream of the start valve (9), in the direction of flow of the fuel (10).

3. The fuel cell system as recited in claim 2, wherein the start valve (9) is designed essentially identical to the metering valve (7).

4. The fuel cell system as recited in claim 1, wherein the metering unit (8) includes several metering valves (7).

5. The fuel cell system as recited in claim 1, wherein the metering valves (7) are essentially identical in design.

6. The fuel cell system as recited in claim 1, wherein at least one rinsing unit (13) is provided for rinsing the fuel cell unit (6) with a rinsing fluid (14).

7. The fuel cell system as recited in claim 1, wherein the metering unit (8) includes at least one reversing device (7) for reversing the direction of flow of the fuel (10) in the anode (12) of the fuel cell unit (6).

8. The fuel cell system as recited in claim 1, wherein an assembly (8) includes, at the least, the metering unit (8) and the start valve (9).

9. The fuel cell system as recited in claim 1, wherein the assembly (8) includes, at the least, a rinsing unit (13) and a pressure-measuring device (11) for measuring the fuel pressure.

10. The fuel cell system as recited in claim 1, wherein the assembly (8) includes, at the least, the metering unit (13), the start valve (9), the rinsing unit (12), and a pressure-measuring device (11).

* * * * *